Patented Oct. 15, 1935                                                          2,017,360

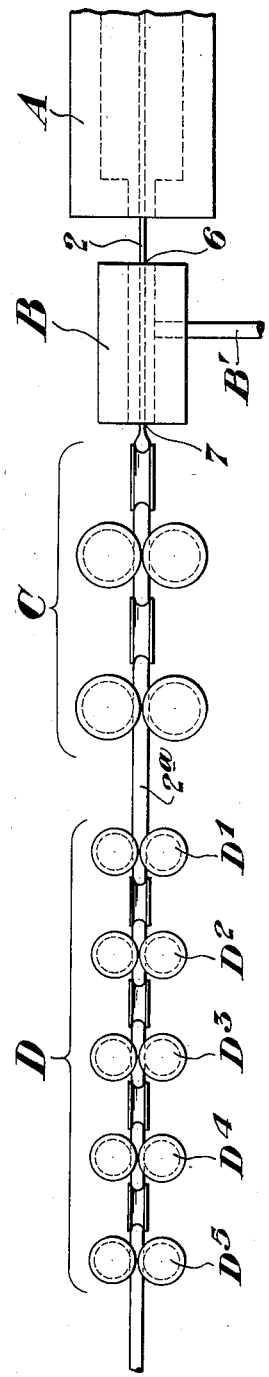

UNITED STATES PATENT OFFICE 2,017,360

METHOD OF SINKING WELDED TUBES

Fred W. Waterman, Pittsburgh, Pa., assignor to National Tube Company, a corporation of New Jersey Application October 22, 1932, Serial No. 639,132

3 Claims. (Cl. 80—62)

This invention relates to a method and apparatus for the continuous manufacture of pipes and tubes, and more particularly to welded pipes and tubes.

Heretofore it has been considered commercially impossible to sink welded pipes or tubes of either the butt or lap weld types.

The present invention has for its principal object the provision of an improved method of manufacturing and sinking welded tubes whereby welded tubes may be commercially made of a diameter considerably larger than their finished diameter, and then reducing by a sinking operation to their finished size, thereby materially increasing the production of this class of tubing for any given size and providing a commercially salable welded tube.

The above and other objects will be made more apparent from consideration of the drawing and specification.

In the drawing:

The figure shows diagrammatically the apparatus used in carrying out my improved method.

Referring more particularly to the drawing, the letter A indicates a heating furnace in which a continuous strip of flat metal or skelp 2, which is to be butt, lap or otherwise welded into pipe or tube, is gradually heated. From heating furnace A the skelp is passed through a deoxidizing and heating chamber B before it is fed to the welding rolls. A deoxidizing gas is introduced to the chamber B at materially above atmospheric pressure by means of pipe B', and is preferably hydrogen, but may be one of a number of other suitable gases.

The skelp 2 is deoxidized in chamber B and heated to the welding temperature, after which it is fed to the welding rolls C, which are arranged in very close proximity to the deoxidizing and heating chamber B. The chamber B is provided with an inlet and outlet, 6 and 7, respectively, for the skelp 2 and which, while not large enough to allow an excessive amount of gas to escape, will nevertheless permit the outflow of a quantity sufficient to envelop the skelp on its way from the heating furnace A and until after it has been welded in rolls C.

Due to the deoxidization of the heated skelp, a very closely knit weld will have been obtained. This deoxidized or "clean" weld is extremely durable and will permit of the same handling only accorded in the past to "seamless tubes".

In close proximity to the welding roll C there is arranged a sinking mill D, through which the welded pipe 2ᵃ is passed, while in a highly heated condition as it comes from the welding rolls. The sinking mill D comprises a plurality of very closely arranged pairs of rolls $D^1$ to $D^9$, inclusive, forming roll passes of correspondingly lesser diameter. The speed of the successive pairs of rolls $D^1$ to $D^9$, inclusive, is gradually increased, in order to permit a stretching of the pipe or tube between the various roll passes. In practice, the pairs of rolls forming the successive passes are set so closely together that the peripheries of the rolls of each successive pair are substantially tangent to a plane between it and the next pair which is at right angles to the common pass line of the mill. By properly regulating the speed ratios of the different pairs of rolls $D^1$ to $D^9$, inclusive, of the sinking mill D, the elongation is made to compensate almost exactly for the decrease in diameter and the thickness of the pipe wall remains unchanged or is very slightly increased. Thereafter, further rolling may be done to reduce this increment to at least that acquired by the sinking.

In operation, strip metal or skelp 2 is heated in the long heating furnace A to a point slightly below that necessary for welding, and which is approximately 2450 degrees Fahrenheit. From the heating furnace A the strip metal or skelp 2 is fed to the deoxidizing and heating chamber B. Deoxidizing gas, such as hydrogen, is fed to the chamber B through a pipe B', and completely removes the oxidization which always accompanies skelp.

The skelp outlet 7 of the deoxidizing and heating chamber B permits the escape of sufficient gas from this point to and through the welding roll pass to completely envelop the skelp until after it is welded. Due to the deoxidization of the skelp a perfect weld will have been obtained, and while still in its highly heated condition the welded pipe or tube 2ᵃ is immediately fed to a sinking mill D, which reduces the diameter of the welded tube to its desired finished diameter and at the same time stretching and elongating the pipe or tube in accordance with the increasing speeds of the various sinking mill roll passes.

While I have shown and described one specific embodiment of my invention, it will be understood that I do not wish to be limited exactly thereto, since various modifications may be made without departing from the scope of my invention, as defined in the following claims.

I claim:

1. The continuous method of making pipes and tubes which consists in heating strip skelp to approximately welding temperature, transferring said strip skelp while in a deoxidizing atmosphere to a deoxidizing chamber, heating the skelp to welding temperature while in said deoxidizing chamber, transferring the said strip skelp while in a completely deoxidizing atmosphere to welding apparatus, forming and welding said skelp while still in a completely deoxidized condition, and finally in sinking the tube formed in said last named operation.

2. The continuous method of making pipes and tubes which consists in heating strip skelp to approximately welding temperature, transferring said strip skelp while in a deoxidizing atmosphere to a deoxidizing chamber, heating the skelp to welding temperature while in said deoxidizing chamber, transferring the said strip skelp while in a completely deoxidizing atmosphere to welding apparatus, forming and welding said skelp while still in a completely deoxidized condition, and finally in subjecting the pipe or tube formed in said last named operation to a combined sinking and stretching operation in which the diameter and wall thickness are materially reduced.

3. The continuous method of making pipes and tubes which consists in heating strip skelp to approximately welding temperature, transferring said strip skelp while in a deoxidizing atmosphere to a deoxidizing chamber, heating the skelp to welding temperature while in said deoxidizing chamber, transferring the said strip skelp while in a completely deoxidizing atmosphere to welding apparatus, forming and welding said skelp while still in a completely deoxidized condition, and finally in subjecting the pipe or tube formed in said last named operation to a combined sinking and stretching operation in which the diameter is materially reduced and the wall thickness is reduced at least an amount equal to the amount of thickening caused by the sinking operation.

FRED W. WATERMAN.